United States Patent
Cociglio

(10) Patent No.: US 9,806,976 B2
(45) Date of Patent: Oct. 31, 2017

(54) TIME MEASUREMENT ON A PACKET FLOW IN A PACKET-SWITCHED COMMUNICATION NETWORK

(75) Inventor: Mauro Cociglio, Turin (IT)

(73) Assignee: Telecom Italia S.p.A., Milan (IT)

( * ) Notice: Subject to any disclaimer, the term of this patent is extended or adjusted under 35 U.S.C. 154(b) by 315 days.

(21) Appl. No.: 14/402,782

(22) PCT Filed: May 22, 2012

(86) PCT No.: PCT/EP2012/059444
§ 371 (c)(1),
(2), (4) Date: Nov. 21, 2014

(87) PCT Pub. No.: WO2013/174417
PCT Pub. Date: Nov. 28, 2013

(65) Prior Publication Data
US 2015/0109953 A1    Apr. 23, 2015

(51) Int. Cl.
*H04L 1/00* (2006.01)
*H04L 12/26* (2006.01)

(52) U.S. Cl.
CPC ......... *H04L 43/0894* (2013.01); *H04L 43/02* (2013.01); *H04L 43/087* (2013.01); *H04L 43/0858* (2013.01); *H04L 43/106* (2013.01)

(58) Field of Classification Search
None
See application file for complete search history.

(56) References Cited

U.S. PATENT DOCUMENTS

| | | | | |
|---|---|---|---|---|
| 6,327,274 B1* | 12/2001 | Ravikanth | ............. | H04J 3/0664 370/516 |
| 8,203,961 B2* | 6/2012 | Yavuz | ................ | H04L 12/5693 370/232 |
| 2007/0266119 A1* | 11/2007 | Ohly | ..................... | H04J 3/0664 709/220 |

FOREIGN PATENT DOCUMENTS

| | | | | |
|---|---|---|---|---|
| GB | 2 422 694 A | | 8/2006 | |
| IT | WO 2010072251 A1 * | | 7/2010 | ......... H04L 43/0835 |
| WO | 01/88763 A1 | | 11/2001 | |
| WO | WO 0188763 A1 * | | 11/2001 | ......... H04L 12/2697 |
| WO | 2010/072251 A1 | | 7/2010 | |
| WO | 2011/079857 A1 | | 7/2011 | |

OTHER PUBLICATIONS

Jan. 21, 2013—(WO) International Search Report—App PCT/EP2012/059444.

* cited by examiner

*Primary Examiner* — Jutai Kao
(74) *Attorney, Agent, or Firm* — Banner & Witcoff, Ltd.

(57) ABSTRACT

A method is provided for performing a time measurement on a packet flow to be transmitted from a first node to a second node of a communication network. The method includes calculating a medium transmission time parameter indicative of an average of transmission time parameters relating to packets transmitted during a given block period; calculating a medium reception time parameter indicative of an average of reception time parameters relating to the same packets; and calculating a medium time measurement indicative of an average performance of the packet flow during the block period using the medium transmission time parameter and the medium reception time parameter.

15 Claims, 7 Drawing Sheets

TIME MEASUREMENT ON A PACKET FLOW IN A PACKET-SWITCHED COMMUNICATION NETWORK

CROSS REFERENCE TO RELATED APPLICATIONS

This is a U.S. National Phase Application under 35 U.S.C. §371 of International Application No. PCT/EP2012/059444, filed May 22, 2012, the entire contents of which are incorporated herein by reference.

TECHNICAL FIELD

The present invention relates to the field of communication networks. In particular, the present invention relates to a method for performing a time measurement (in particular, a measurement of delay and/or interarrival jitter), on a packet flow transmitted in a packet-switched communication network. Further, the present invention relates to nodes and computers for communication network configured to implement such a method, and to computer networks comprising such nodes and computers.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, thereby causing a total packet loss until the failure is either bypassed or fixed. Alternatively, packets may be discarded by a node due to a congestion of its ports. Besides, packets may be discarded by a node since they contain bit errors. In any case, when providing a service by transmitting data through a packet-switched network, the rate of packets lost during transmission affects the quality of service (QoS) of that service.

Besides, a packet is transmitted at a transmission time by the source node and is received at a reception time by the destination node. The time elapsing between transmission time and reception time is typically called "one way delay" (or, briefly, "delay"). The delay of a packet is given by the following equation:

$$D = Trx - Ttx, \quad [1]$$

where Trx is the transmission time and Ttx is the reception time of the packet.

The delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the delay of a packet is almost unpredictable.

Besides, packets of a same packet flow may have different delays. The difference in the delays of two packets of a same data flow is termed "interarrival jitter". In particular, if Ttx1 and Ttx2 are the transmission times for a first packet and a second packet, and Trx1 and Trx2 are the reception times for the first packet and the second packet, the interarrival jitter may be expressed as:

$$J = (Trx1 - Trx2) - (Ttx1 - Ttx2). \quad [2]$$

When a communication service (in particular, a real-time voice or data service such as call, conference call, video conference, etc.) is provided by means of a packet-switched network, the delay and interarrival jitter of the packet flow carrying the service strongly affect the quality of service (QoS) perceived by the end users of the service. Therefore, measuring delay/interarrival jitter of packet flows in a communication network is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" alternate in time with blocks of data units marked with "0". The blocks may have a same duration termed "block period" Tb (e.g. 5 minutes). Further, the transmitting node increases by one a first counter C1 each time a data unit marked by "1" is transmitted, and a second counter C0 each time a data unit marked by "0" is transmitted. The marked data units are then received at the receiving node. Each time the receiving node receives a data unit, it checks its marking, increases a third counter C'1 if the marking is "1" and increases a fourth counter C'0 if the marking is "0". The values of the counters C1, C0, C'1 and C'0 are periodically detected and the detected values are used for calculating the data loss at each block period.

WO 2011/079857 (in the name of the same Applicant) discloses a method for performing a time measurement (in particular, for measuring delay and/or interarrival jitter) on a data flow transmitted from a transmitting node to a receiving node of a communication network. According to WO 2011/079857, at the transmitting node, in addition to the above marking operation disclosed by WO 2010/072251, a transmission timestamp is also generated at each block period, which indicates the time at which a predetermined data unit of the current block (for instance, the first data unit of the current block) is transmitted. At the receiving node, a reception timestamp is generated at each block period, which indicates the time at which the predetermined data unit of the current block is received. At each block period, the transmission timestamp and the reception timestamp are used for calculating the delay of the predefined data unit of the current block.

SUMMARY OF THE INVENTION

The Applicant has perceived the need to improve the solution for performing a time measurement described by WO 2011/079857.

Indeed the above solution provides, for each block period, a single delay measurement referred to a sample packet (namely, the predetermined data unit). Such delay measurement does not provide any indication of the delays undergone by the other packets transmitted during the same block period, which may be very different from the delay undergone by the sample packet.

Further, in case the sample packet of a given block period is lost before it reaches the receiving node, no significant delay measurement may be calculated for that block period. Also in case a reception sequence error occurs in a block period (namely, the packets are received in an order different from the order in which they were transmitted) which involves the sample packet, no significant delay measurement may be calculated for that block period.

In view of the above, the Applicant has tackled the problem of providing a method for performing a time measurement on a packet flow transmitted in a packet-switched communication network, which provides a result indicative of the behaviour of all the transmitted packets and which is more robust against possible packet loss and reception sequence errors.

In the following description and in the claims, the expression "performing a time measurement" will designate an operation of measuring:
- a delay induced on a packet by transmission from the first node to the second node; and/or
- an interarrival jitter induced on a pair of packets by transmission from the first node to the second node.

Besides, in the following description and in the claims, the expression "marking a packet" will designate an operation of setting a feature of the packet to a predefined marking value, in particular to one of at least two alternative marking values. For instance, the operation of marking a packet may comprise the operation of setting one or more bits of the packet (e.g. one bit or a bit sequence of its header) to one of at least two predefined alternative marking values, the operation of setting its frequency or its phase to one of at least two predefined alternative marking values, and so on.

According to a first aspect, the present invention provides a method for performing a time measurement on a packet flow to be transmitted from a first node to a second node of a communication network, the packet flow comprising at least two packets transmitted by the first node during a block period, the method comprising:
a) calculating a medium transmission time parameter indicative of an average of at least two transmission time parameters relating to the at least two packets;
b) calculating a medium reception time parameter indicative of an average of at least two reception time parameters relating to the at least two packets; and
c) calculating a medium time measurement indicative of an average performance of the packet flow during the block period using the medium transmission time parameter and the medium reception time parameter.

Preferably:
at step a), the medium transmission time parameter comprises a medium transmission timestamp calculated as an average of at least two transmission timestamps generated upon transmission of the at least two packets;
at step b), the medium reception time parameter comprises a medium reception timestamp calculated as an average of at least two reception timestamps generated upon reception of the at least two packets;
at step c), the medium time measurement comprises a medium delay calculated as a difference between the medium reception timestamp and the medium transmission timestamp.

Further, preferably:
at step a), the medium transmission time parameter comprises a medium one-point transmission jitter calculated as a difference between a last-packet transmission timestamp indicative of a transmission time of a last packet of the at least two packets and a first-packet transmission timestamp indicative of a transmission time of a first packet of the at least two packets, divided by a first number of packets transmitted by the first node during the block period decreased by 1;
at step b), the medium reception time parameter comprises a medium one-point reception jitter calculated as a difference between a last-packet reception timestamp indicative of a reception time of the last packet of the at least two packets and a first-packet reception timestamp indicative of a reception time of the first packet of the at least two packets, divided by a second number of packets received by the second node during the block period decreased by 1; and
at step c), the medium time measurement comprises a medium jitter calculated as a difference between the medium one-point reception jitter and the medium one-point transmission jitter.

Alternatively:
at step a), the medium transmission time parameter comprises a medium one-point transmission jitter calculated as a difference between a last-packet transmission timestamp indicative of a transmission time of a last packet of the at least two packets and a first-packet transmission timestamp indicative of a transmission time of a first packet of the at least two packets, divided by a first number of packets transmitted by the first node during the block period decreased by 1;
at step b), the medium reception time parameter comprises a medium one-point reception jitter calculated as a difference between a last-packet reception timestamp indicative of a reception time of the last packet of the at least two packets and a first-packet reception timestamp indicative of a reception time of the first packet of the at least two packets, divided by the first number of packets transmitted by the first node during the block period decreased by 1; and
at step c), the medium time measurement comprises a medium jitter calculated as a difference between the medium one-point reception jitter and the medium one-point transmission jitter.

Preferably, the method further comprises, upon transmission of the packet flow, dividing the packet flow in first packets transmitted during first block periods and second packets transmitted during second block periods, the first block periods alternating in time with the second block periods.

According to preferred embodiments, dividing the packet flow comprises marking the first packets by a first marking value and marking the second packets by a second marking value.

According to a first embodiment, step a) is performed by the first node and step b) is performed by the second node.

According to a second alternative embodiment, step a) is performed by a first computer connected to the first node and step b) is performed by a second computer connected to the second node.

Preferably, step c) is performed by a management server cooperating with the communication network.

Alternatively, step c) is performed by one of the first node and the second node.

According to a second aspect, the present invention provides a node for a communication network, the node being configured to transmit a packet flow to a further node of the communication network, the packet flow comprising at least two packets transmitted by the node during a block period, the node being configured to:

calculate a medium transmission time parameter indicative of an average of at least two transmission time parameters relating to the at least two packets; and provide the medium transmission time parameter for calculating a medium time measurement indicative of an average performance of the packet flow during the block period.

According to a third aspect, the present invention provides a node for a communication network, the node being configured to receive a packet flow from a further node of the communication network, the packet flow comprising at least two packets transmitted by the further node during a block period, the node being configured to:

calculate a medium reception time parameter indicative of an average of at least two reception time parameters relating to the at least two packets; and provide the medium reception time parameter for calculating a medium time measurement indicative of an average performance of the packet flow during the block period.

According to a fourth aspect, the present invention provides a communication network comprising a first node and a second node, the first node being configured to transmit a packet flow to the second node, the packet flow comprising at least two packets transmitted by the first node during a block period, wherein the first node is according to the above second aspect and wherein the second node is according to the above third aspect.

According to a fifth aspect, the present invention provides a computer program product, loadable in the memory of at least one computer and including software code portions for performing the steps of the method set forth above, when the product is run on at least one computer.

According to a sixth aspect, the present invention provides a computer configured for being connected to a node of a communication network, the node being configured to transmit a packet flow to a further node of the communication network, the packet flow comprising at least two packets transmitted by the node during a block period, the computer being configured to:

calculate a medium transmission time parameter indicative of an average of at least two transmission time parameters relating to the at least two packets; and provide the medium transmission time parameter for calculating a first medium time measurement indicative of an average performance of the first packet flow during the block period.

According to a seventh aspect, the present invention provides a computer configured for being connected to a node of a communication network, the node being configured to receive a packet flow from a further node of the communication network, the packet flow comprising at least two packets transmitted by the further node during a block period, the computer being configured to:

calculate a medium reception time parameter indicative of an average of at least two reception time parameters relating to the at least two packets; and provide the medium reception time parameter for calculating a medium time measurement indicative of an average performance of the packet flow during the block period.

According to a eighth aspect, the present invention provides a communication network comprising a first node and a second node, the first node being configured to transmit a packet flow to the second node, the packet flow comprising at least two packets transmitted by the first node during a block period, the communication network further comprising a first computer connected to the first node and a second computer connected to the second node, wherein the first computer is according to the above fifth aspect and the second computer is according to the above sixth aspect.

According to a first preferred variant, the first computer is further configured to receive the packet flow from the first node and to forward the packet flow to the second computer; and the second computer is further configured to receive the packet flow from first computer and to forward the packet flow to the second node.

According to a second preferred variant, the first computer is further configured to receive from the first node a first copy of the packet flow and to terminate the first copy to the packet flow upon calculation of the medium transmission time parameter; and the second computer is further configured to receive from the second node a second copy of the packet flow and to terminate the second copy to the packet flow upon calculation of the medium reception time parameter.

According to a third preferred variant, the first computer is further configured to generate the packet flow and forward the packet flow to the first node; and the second computer is further configured to receive the packet flow from the second node and to terminate the packet flow.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
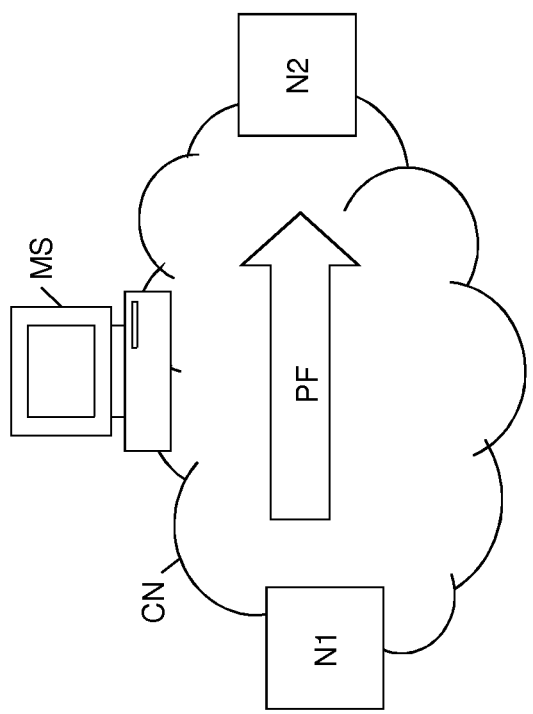
FIG. 1 schematically shows an exemplary packet-switched network.

FIG. 1 schematically shows an exemplary packet-switched communication network CN in which the method for performing a time measurement according to embodiments of the present invention may be implemented. The communication network CN may be an IP network, an Ethernet network, an MPLS network or any other known type of packet-switched communication network.

The communication network CN comprises a plurality of nodes reciprocally interconnected by links according to any known topology.

In particular, the communication network CN comprises a first node N1 and a second node N2. The first node N1 (also termed herein after "transmitting node") is configured to transmit a packet flow PF to the second node (also termed "receiving node"), possibly through intermediate nodes (not shown in FIG. 1) of the communication network CN. The transmitting node N1 may be either the source node of the packet flow PF or an intermediate node of the path from the source node to the destination node. Similarly, the receiving node N2 may be either the destination node of the packet flow PF or an intermediate node of the path from the source node to the destination node.

Preferably, the communication network CN is also suitable for cooperating with a management server MS. The management server MS may be either a stand-alone server connected to any of the nodes of the communication network CN. Alternatively, the management server MS may be implemented at any of the nodes of the communication network CN.

According to preferred embodiments of the present invention, the packet flow PF comprises a sequence of packets Pki which are marked, i.e. each packet Pki includes a feature (namely, a field comprising at least one bit) whose value is set to one of two alternative marking values Va, Vb.

Figure 2:
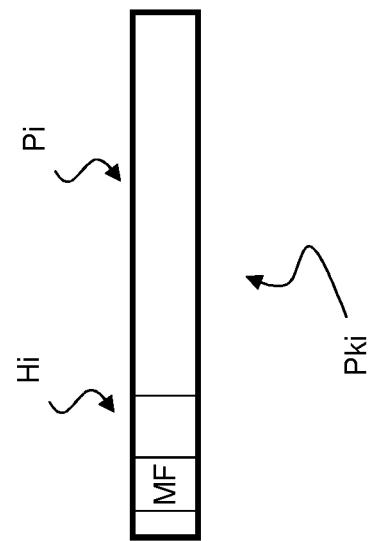
FIG. 2 schematically shows a packet's structure, according to an embodiment of the present invention.

More particularly, as shown in FIG. 2, each packet Pki comprises a header Hi and a payload Pi. The payload Pi comprises data to be transmitted. Besides, preferably, the header Hi comprises information for routing the packet Pki, such as the source node address and the destination node address. The packet Pki further comprises a marking field MF, which may be set to one of two alternative marking values Va, Vb. The marking field MF is preferably comprised in the header Hi. The marking field MF may be for instance a field to which the protocol according to which the packet Pki is formatted has not assigned a specific function yet. Alternatively, the marking field MF may be comprised in a field having other uses. For instance, in case of IP packets, the marking field MF may comprise a bit of the 8-bit DS (Differentiated Service) field, and its two alternative marking values Va and Vb may be 1 and 0, respectively.

The packets Pki are preferably marked upon their transmission by the transmitting node N1, which properly sets the value of the marking field MF to one of the two alternative marking values Va, Vb. The transmitting node N1 periodically changes the marking value Va, Vb assigned to the marking field MF (for instance, 1 or 0) with a period Tb, which will be termed herein after "block period". This way, packets Pki marked during first block periods (also termed herein after "even block periods") are marked by a first marking value Va (e.g. 1), while packets Pki marked during second block periods (also termed herein after "odd block periods") which alternate in time with the first block periods are marked by a second marking value Vb (e.g. 0).

The block period Tb may be set by the network operator, according to the desired time measurement rate (as it will be described in detail herein after, the block period Tb is also the measurement period). For instance, the block period Tb may be equal to 5 minutes.

According to preferred embodiments of the present invention, at each block period T(k) (k=0, 1, 2, 3, etc.), for each packet Pki a transmission timestamp TS1(i, k) is generated, which indicates the time at which the packet Pki is transmitted by the transmitting node N1. Then, a medium transmission timestamp TSM1(k) of the block period T(k) is preferably calculated according to the following equation:

$$TSM1(k) = \frac{\sum_{i=1}^{C1(k)} TS1(i, k)}{C1(k)}, \quad [3]$$

where C1(k) is the count of packets Pki transmitted by the transmitting node N1 during the block period T(k).

Further, at each block period T(k), for each packet Pki a reception timestamp TS2(i, k) is generated, which indicates the time at which the packet Pki is received by the receiving node N2. Then, a medium reception timestamp TSM2(k) is preferably calculated according to the following equation:

$$TSM2(k) = \frac{\sum_{i=1}^{C2(k)} TS2(i, k)}{C2(k)}, \quad [4]$$

where C2(k) is the count of packets Pki received by the receiving node N2 during the block period T(k). The reception packet count C2(k) is lower than the transmission packet count C1(k) if packets of the packet flow PF were lost during the current block period T(k), while it is equal to the reception packet count C1(k) if no packet loss occurred during the current block period T(k).

Preferably, for each block period T(k), a medium delay DM(k) is then calculated according to the following equation:

$$DM(k)=TSM2(k)-TSM1(k). \quad [5]$$

Hence, according to the present invention, instead of providing a delay measurement referring to a single sample packet for each block period, a delay measurement indicative of the average delay undergone by all the packets transmitted during the block period T(k) is provided. In other words, the delay measurement calculated according to the present invention provides an estimate of the performance of the packet flow PF during the block period T(k) as a whole.

The calculation is advantageously based on a single medium transmission timestamp TSM1(k), which aggregates the transmission timestamps relating to all the packets transmitted during the block period T(k), and a single medium reception timestamp TSM2(k), which aggregates the reception timestamps relating to all the packets received during the block period T(k). Hence, in case the medium delay calculation is carried out by the management server MS, at each block period T(k) each node N1 and N2 has to transmit a single timestamp TSM1(k) and TSM2(k) to the management server MS, respectively. Hence, the calculation of the medium delay indicative of the delays of all the packets transmitted and received during a block period requires the transmission of two timestamps only through the communication network CN. This advantageously allows saving bandwidth in the communication network CN.

Furthermore, the medium delay measurement is resistant against possible packet loss and/or reception sequence errors occurring within the block period T(k), as it will be discussed in detail herein after.

According to a preferred embodiment of the present invention, for each block period T(k), in addition to calculating the medium transmission timestamp TSM1(k) according to equation[3], also a medium one-point transmission jitter OPJM1(k) is calculated according to the following equation:

$$OPJM1(k) = \frac{\sum_{i=1}^{C1(k)-1} TS1(i+1, k) - TS1(i, k)}{C1(k)-1} = \frac{TS1(C1(k), k) - TS1(1, k)}{C1(k)-1}. \quad [6]$$

The medium one-point transmission jitter OPJM1(k) basically is the average of the offsets between transmission times of couples of consecutive packets transmitted during the block period T(k).

Further, for each block period T(k), in addition to calculating the medium reception timestamp TSM2(k) according to equation[4], also a medium one-point reception jitter OPJM2(k) is calculated according to the following equation:

$$OPJM2(k) = \frac{\sum_{i=1}^{C2(k)-1} TS2(i+1,k) - TS2(i,k)}{C2(k)-1} = \frac{TS2(C2(k),k) - TS2(1,k)}{C2(k)-1}. \quad [7]$$

The medium one-point reception jitter OPJM2(k) basically is the average of the offsets between reception times of couples of consecutive packets received during the block period T(k).

Preferably, for each block period T(k), a medium jitter JM(k) is then calculated according to the following equation:

$$JM(k) = OPJM2(k) - OPJM1(k). \quad [8]$$

Hence, according to the present invention, instead of providing a jitter measurement referring to a single couple of sample consecutive packets for each block period, a jitter measurement indicative of the average jitter undergone by all the couples of consecutive packets transmitted during the block period T(k) is provided. Hence, also the jitter measurement calculated according to the present invention provides an estimate of the performance of the packet flow during the block period T(k) as a whole.

Similarly to the delay measurement described above, also the jitter measurement calculated according to equations [6], [7] and [8] provides the same advantages: reduced amount of information to be transmitted over the communication network CN and resiliency to packet loss and/or reception sequence errors occurring during the block period T(k), as it will be discussed in detail herein after.

The method for performing time measurements according to the present invention will be now described in further detail.

Figure 3A:
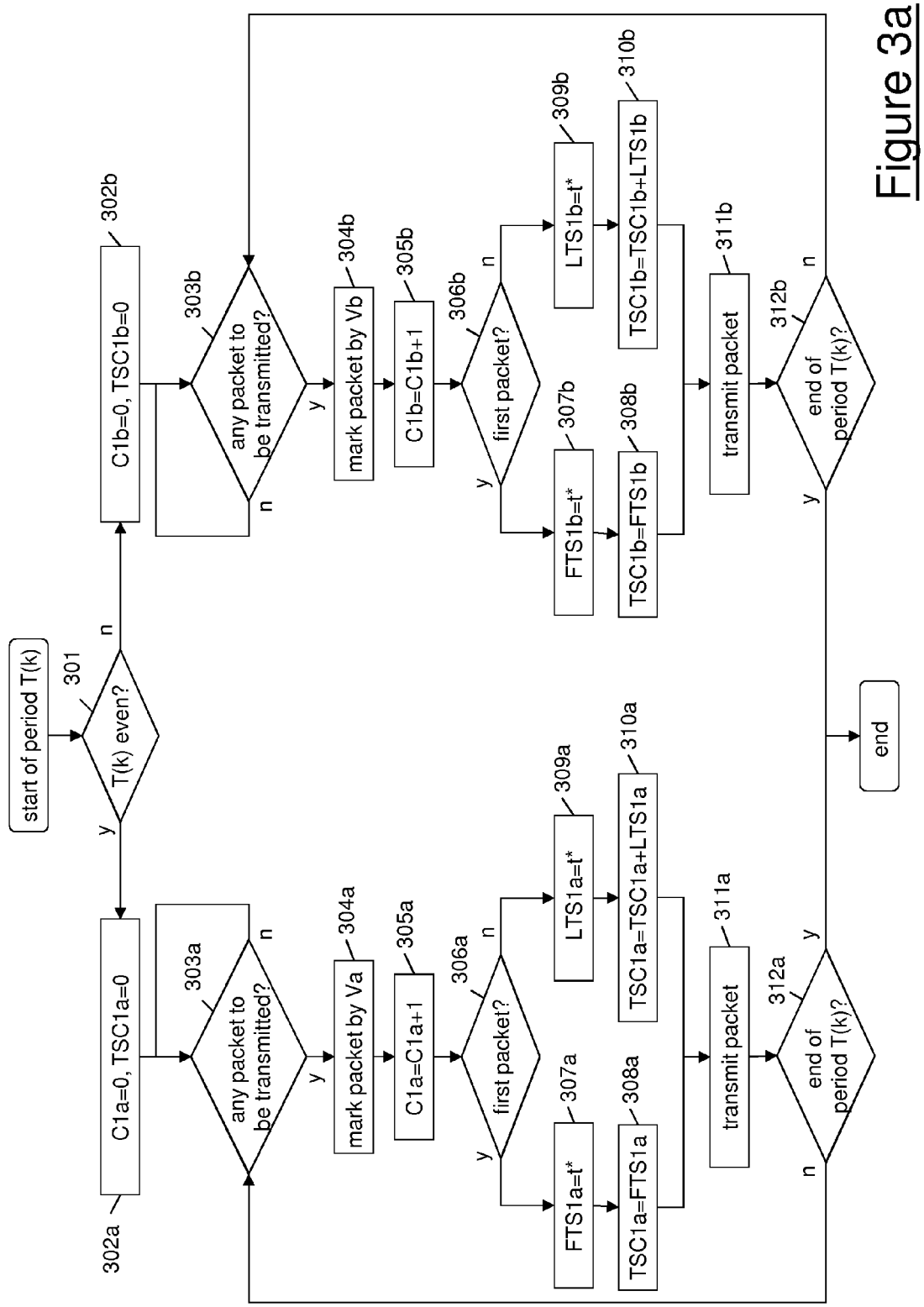
FIGS. 3a and 3b are flow charts illustrating the method for performing a time measurement according to an embodiment of the present invention, at the transmitting side.

By referring first to FIG. 3a, at the beginning of each block period T(k), the transmitting node N1 preferably checks whether the block period T(k) is an even block period or an odd block period (step 301), and accordingly determines the marking value Va (during even block periods) or Vb (during odd block periods) to be applied to packets that will be transmitted during the block period T(k).

Then, if the block period T(k) is an even block period, two variables are preferably initialised to zero: a first transmission counter C1a and a first cumulative transmission timestamp TSC1a(step 302a).

Then, the transmitting node N1 waits for possible packets Pki of the packet flow PF to be transmitted (step 303a). The transmitting node N1 preferably identifies the packets Pki of the packet flow PF by using at least part of its destination address, at least part of its source address and, optionally, other fields of the packet header Hi (for instance, the field DSCP in case of IP packets).

Before transmitting a packet Pki, the node N1 preferably marks it (step 304a) by the marking value Va. Further, the first transmission counter C1a is preferably increased by 1 (step 305a).

Then, if the packet Pki is the first packet to be transmitted during the current block period T(k) (step 306a), a first first-packet transmission timestamp FTS1a is preferably set equal to a current time t* indicated by a local clock of the transmitting node N1 (step 307a). Then, the first cumulative transmission timestamp TSC1a is preferably set equal to the first first-packet transmission timestamp FTS1a(step 308a).

Otherwise, if the packet Pki is not the first packet to be transmitted during the current block period T(k), a first last-packet transmission timestamp LTS1a is preferably set equal to the current time t* indicated by the local clock of the transmitting node N1 (step 309a). Then, the first cumulative transmission timestamp TSC1a is preferably increased by the first last-packet transmission timestamp LTS1a (step 310a).

The packet Pki is then transmitted (step 311a). Step 311a may be carried out substantially in parallel to steps 305a-310a.

Steps 304a-311a are preferably iterated each time a packet Pki of the packet flow PF has to be transmitted, until the end of the block period T(k) (step 312a).

If, at step 301, it is determined that the block period T(k) is an odd block period, two variables are preferably initialised to zero: a second transmission counter C1b and a second cumulative transmission timestamp TSC1b(step 302b).

Then, the transmitting node N1 waits for possible packets Pki to be transmitted (step 303b). Before transmission of a packet Pki, the node N1 preferably marks it (step 304b) by the marking value Vb. Further, the second transmission counter C1b is preferably increased by 1 (step 305b).

Then, if the packet Pki is the first packet to be transmitted during the current block period T(k) (step 306b), a second first-packet transmission timestamp FTS1b is preferably set equal to the current time t* indicated by the local clock of the transmitting node N1 (step 307b). Then, the second cumulative transmission timestamp TSC1b is preferably set equal to the second first-packet transmission timestamp FTS1b(step 308b).

Otherwise, if the packet Pki is not the first packet to be transmitted during the current block period T(k), a second last-packet transmission timestamp LTS1b is preferably set equal to the current time t* indicated by the local clock of the transmitting node N1 (step 309b). Then, the second cumulative transmission timestamp TSC1b is preferably increased by the second last-packet transmission timestamp LTS1b (step 310b).

The packet Pki is then transmitted (step 311b). Step 311b may be carried out substantially in parallel to steps 305b-310b.

Steps 304b-311b are preferably iterated each time a packet Pki of the packet flow PF has to be transmitted, until the end of the block period T(k) (step 312b).

Figure 3B:
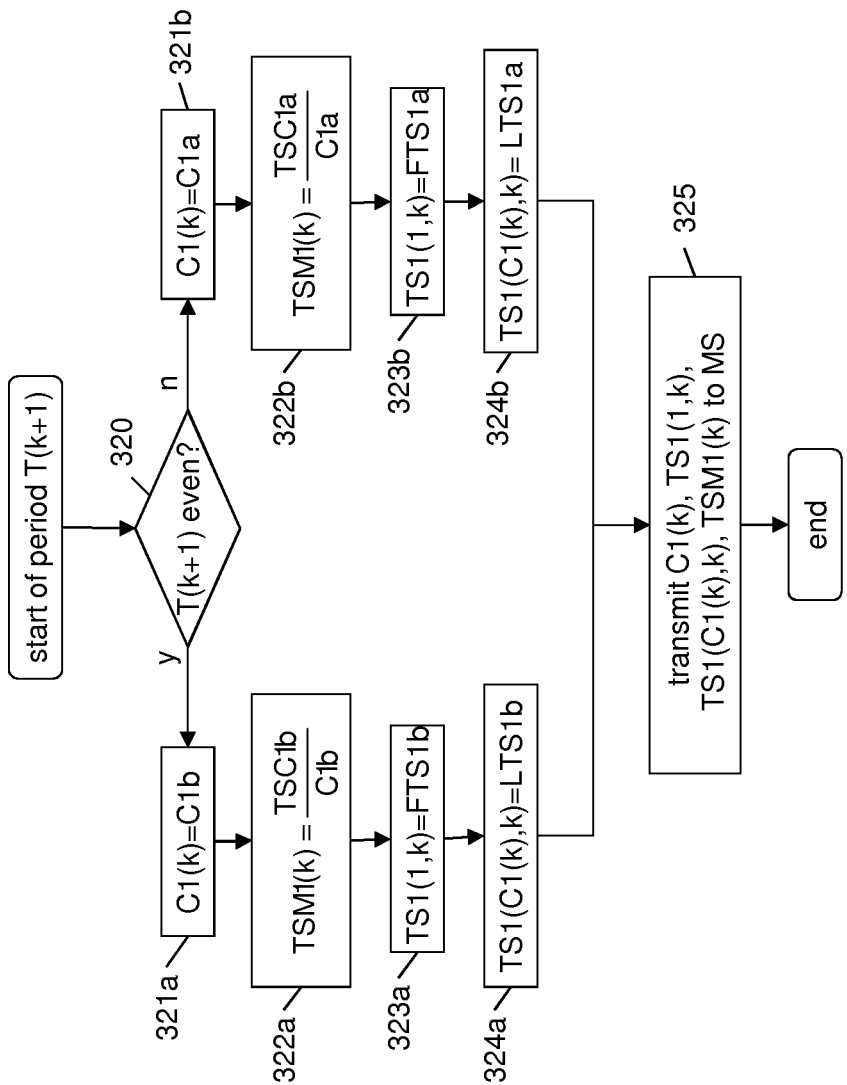

Referring now to FIG. 3b, at the beginning of the successive block period T(k+1), it is checked whether the block period T(k+1) is an even or odd block period (step 320).

If the block period T(k+1) is an even block period, it is determined that the values of the variables relating to packets marked by Va (namely C1a, TSC1a and LTS1a) may be currently changing, whereas the values of the variables relating to packets marked by Vb (namely C1b, TSC1b and LTS1b) are currently constant. Hence, a transmission packet count C1(k) is set equal to the value of the second transmission counter C1b reached at the last iteration of step 305b during the previous block period T(k) (step 321a). Further, a medium transmission timestamp TSM1(k) is calculated as the value of the second cumulative transmission timestamp TSC1*b* divided by the value of the second transmission counter C1*b* reached at the last iteration of steps 310*b* and 305*b*, respectively, during the previous block period T(k) (step 322*a*). Further, a first-packet transmission timestamp TS1(1, k) is set equal to the value of the second first-packet transmission timestamp FTS1*b* determined at step 307*b* during the previous block period T(k) (step 323*a*). Further, a last-packet transmission timestamp TS1(C1(k), k) is set equal to the value of the second last-packet transmission timestamp LTS1*b* reached at the last iteration of step 309*b* during the previous block period T(k) (step 324*a*).

Otherwise, if the block period T(k+1) is an odd block period, it is determined that the values of the variables relating to packets marked by Vb (namely C1b, TSC1*b* and LTS1*b*) may be currently changing, whereas the values of the variables relating to packets marked by Va (namely C1a, TSC1*a* and LTS1*a*) are currently constant. Hence, the transmission packet count C1(k) is set equal to the value of the first transmission counter C1a reached at the last iteration of step 305*a* during the previous block period T(k) (step 321*b*). Further, the medium transmission timestamp TSM1(k) is calculated as the value of the first cumulative transmission timestamp TSC1*a* divided by the value of the first transmission counter C1a reached at the last iteration of steps 310*a* and 305*a*, respectively, during the previous block period T(k) (step 322*b*). Further, the first-packet transmission timestamp TS1(1, k) is set equal to the value of the first first-packet transmission timestamp FTS1*a* determined at step 307*a* during the previous block period T(k) (step 323*b*). Further, the last-packet transmission timestamp TS1(C1(k), k) is set equal to the value of the first last-packet transmission timestamp LTS1*a* reached at the last iteration of step 309*a* during the previous block period T(k) (step 324*b*).

Hence, the transmission packet count C1(k) determined at step 321*a* or 321*b* indicates the number of packets Pki transmitted during the block period T(k). Further, the medium transmission timestamp TSM1(k) calculated at step 322*a* or 322*b* corresponds to the medium transmission timestamp TSM1(k) calculated according to the above equation [3] and is accordingly a medium transmission timestamp of the packets Pki transmitted during the block period T(k). Further, the first-packet transmission timestamp TS1 (1, k) set at step 323*a* or 323*b* is the transmission timestamp of the first packet Pki transmitted during the block period T(k). Finally, the last-packet transmission timestamp TS1 (C1(k), k) set at step 324*a* or 324*b* is the transmission timestamp of the last packet Pki transmitted during the block period T(k).

Preferably, the time at which steps 312*a*-324*a* and 321*b*-324*b* are performed is delayed by a safety wait time SWT relative to the start time of the block period T(k+1), for reasons that will be described in detail herein after.

Then, the transmission packet count C1(k), the first-packet transmission timestamp TS1(1, k), the last-packet transmission timestamp TS1(C1(k), k) and the medium transmission timestamp TSM1(k) are transmitted to the management server MS (step 325), which will use them for calculating a medium delay DM(k) and a medium jitter JM(k) referred to the block period T(k), as it will be described in detail herein after. According to an alternative embodiment, before step 325 is performed, a medium one-point transmission jitter OPJM1(k) may be calculated as the difference between the last-packet transmission timestamp TS1(C1(k), k) and the first-packet transmission timestamp TS1(1, k) divided by the transmission packet count C1(k) decreased by 1. The calculated medium one-point transmission jitter OPJM1(k) corresponds to the medium one-point transmission jitter OPJM1(k) calculated according to the above equation[6]. In such case, at step 325 the medium one-point transmission jitter OPJM1(k) may be transmitted in addition to or instead of TS1(1, k) and TS1(C1(k), k).

Step 325 may be performed e.g. by establishing a communication session between the transmitting node N1 and the management server MS based on a known communication protocol, for instance FTP (File Transfer Protocol). The communication session may be started either by the transmitting node N1 or the management server MS.

Further, step 325 is preferably performed at a random instant comprised between the end of step 324*a*/324*b* and the end of the block period T(k+1) brought forward by a further safety wait time SWT', for reasons that will be described in detail herein after.

Figure 4A:
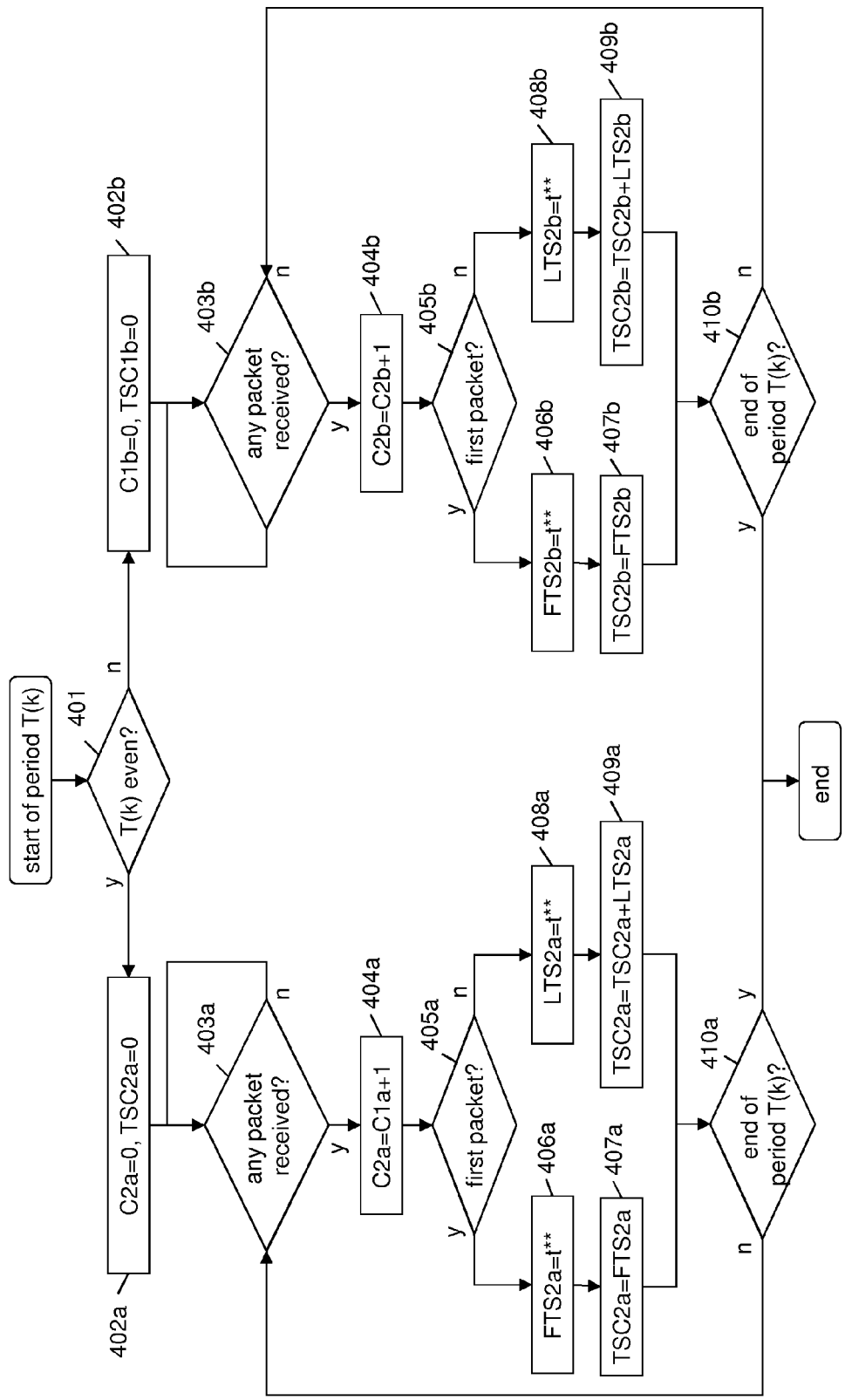
FIGS. 4a and 4b are flow charts illustrating the method for performing a time measurement according to an embodiment of the present invention, at the receiving side.

By referring now to FIG. 4*a*, at the beginning of each block period T(k), also the receiving node N2 preferably determines whether the block period T(k) is an even block period or an odd block period (step 401).

Then, if the block period T(k) is an even block period, two variables are preferably initialised to zero: a first reception counter C2a and a first cumulative reception timestamp TSC2*a* (step 402*a*).

Then, the receiving node N2 waits for possible packets Pki (step 403*a*). Also the receiving node N2 preferably identifies the packets Pki of the packet flow PF by using at least part of its destination address, at least part of its source address and, optionally, other fields of the packet header Hi (for instance, the field DSCP in case of IP packets).

Upon reception of a packet Pki, the first reception counter C2a is preferably increased by 1 (step 404*a*).

Then, if the packet Pki is the first packet received during the current block period T(k) (step 405*a*), a first first-packet reception timestamp FTS2*a* is preferably set equal to a current time t** indicated by a local clock of the receiving node N2 (step 406*a*). Then, the first cumulative reception timestamp TSC2*a* is preferably set equal to the first first-packet reception timestamp FTS2*a* (step 407*a*).

Otherwise, if the packet Pki is not the first packet received during the current block period T(k), a first last-packet reception timestamp LTS2*a* is preferably set equal to the current time t** indicated by the local clock of the receiving node N2 (step 408*a*). Then, the first cumulative reception timestamp TSC2*a* is preferably increased by the first last-packet reception timestamp LTS2*a* (step 409*a*).

Steps 404*a*-409*a* are preferably iterated each time a packet Pki of the packet flow PF is received, until the end of the block period T(k) (step 410*a*).

If, at step 401, it is determined that the block period T(k) is an odd block period, two variables are preferably initialised: a second reception counter C2*b* and a second cumulative reception timestamp TSC2*b* (step 402*b*).

Then, the receiving node N2 waits for possible packets Pki (step 403*b*). Upon reception of a packet Pki, the second reception counter C2*b* is preferably increased by 1 (step 404*b*).

Then, if the packet Pki is the first packet received during the current block period T(k) (step 405*b*), a second first-packet reception timestamp FTS2*b* is preferably set equal to the current time t** indicated by the local clock of the receiving node N2 (step 406*b*). Then, the second cumulative reception timestamp TSC2*b* is preferably set equal to the second first-packet reception timestamp FTS2*b* (step 407*b*).

Otherwise, if the packet Pki is not the first packet received during the current block period T(k), a second last-packet reception timestamp LTS2*b* is preferably set equal to the current time t indicated by the local clock of the receiving node N2 (step 408***b*). Then, the second cumulative reception timestamp TSC2*b* is preferably increased by the second last-packet reception timestamp LTS2*b* (step 409*b*).

Steps 404*b*-409*b* are preferably iterated each time a packet Pki of the packet flow PF is received, until the end of the block period T(k) (step 410*b*).

Figure 4B:
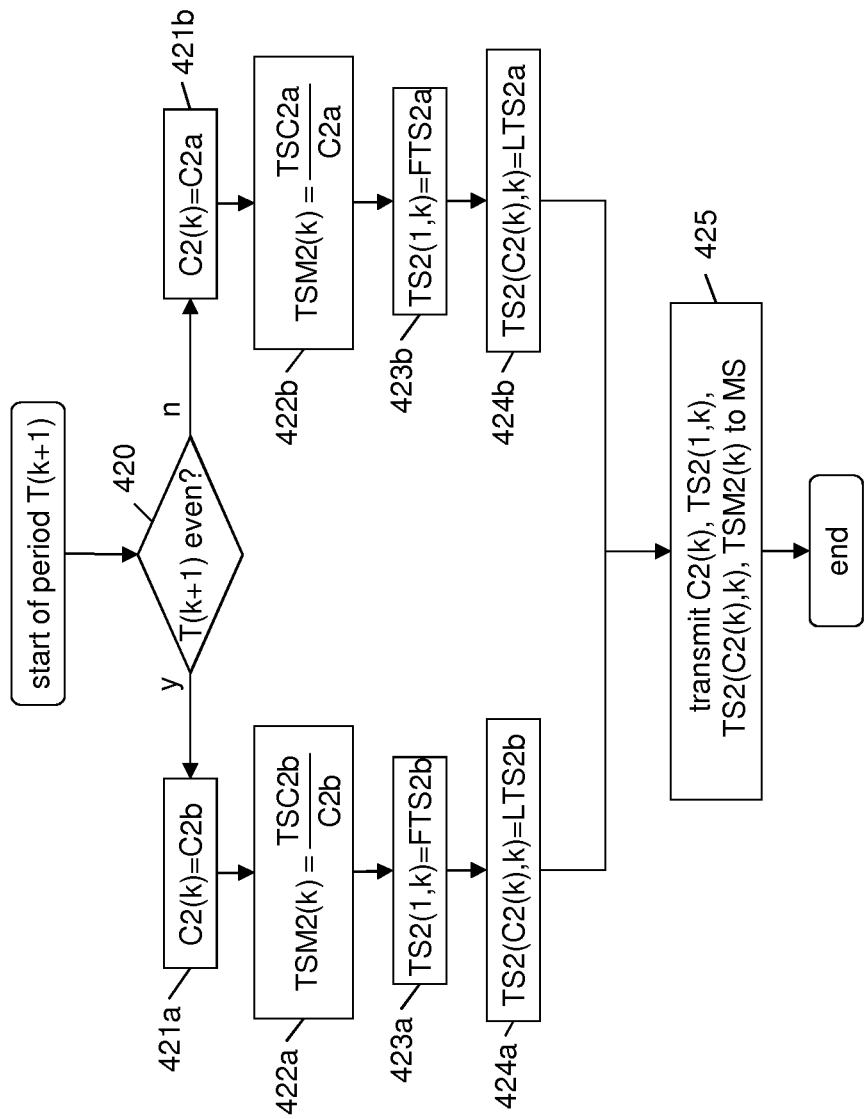

Referring now to FIG. 4*b*, at the beginning of the successive block period T(k+1), it is determined whether the block period T(k+1) is an even or odd block period (step 420).

If the block period T(k+1) is an even block period, it is determined that the values of the variables relating to packets marked by Va (namely C2*a*, TSC2*a* and LTS2*a*) may be currently changing, whereas the values of the variables relating to packets marked by Vb (namely C2*b*, TSC2*b* and LTS2*b*) are currently constant. Hence, a reception packet count C2(k) is set equal to the value of the second reception counter C2*b* reached at the last iteration of step 404*b* during the previous block period T(k) (step 421*a*). Further, a medium reception timestamp TSM2(k) is calculated as the value of the second cumulative reception timestamp TSC2*b* divided by the value of the second reception counter C2*b* reached at the last iteration of steps 409*b* and 404*b*, respectively, during the previous block period T(k) (step 422*a*). Further, a first-packet reception timestamp TS2(1, k) is set equal to the value of the second first-packet reception timestamp FTS1*b* determined at step 406*b* during the previous block period T(k) (step 423*a*). Further, a last-packet reception timestamp TS2(C2(k), k) is set equal to the value of the second last-packet reception timestamp LTS2*b* reached at the last iteration of step 408*b* during the previous block period T(k) (step 424*a*).

Otherwise, if the block period T(k+1) is an odd block period, it is determined that the values of the variables relating to packets marked by Vb (namely C2*b*, TSC2*b* and LTS2*b*) may be currently changing, whereas the values of the variables relating to packets marked by Va (namely C2*a*, TSC2*a* and LTS2a) are currently constant. Hence, the reception packet count C2(k) is set equal to the value of the first reception counter C2*a* reached at the last iteration of step 404*a* during the previous block period T(k) (step 421*b*). Further, the medium reception timestamp TSM2(k) is calculated as the value of the first cumulative reception timestamp TSC2*a* divided by the value of the first reception counter C2*a* reached at the last iteration of step 409*a* and 404*a*, respectively, during the previous block period T(k) (step 422*b*). Further, the first-packet reception timestamp TS2(1, k) is set equal to the value of the first first-packet reception timestamp FTS2*a* determined at step 406*a* during the previous block period T(k) (step 423*b*). Further, the last-packet reception timestamp TS2(C2(k), k) is set equal to the value of the first last-packet reception timestamp LTS2a reached at the last iteration of step 408*a* during the previous block period T(k) (step 424*b*).

Hence, the reception packet count C2(k) determined at step 421*a* or 421*b* indicates the number of packets Pki received during the block period T(k). Further, the medium reception timestamp TSM2(k) calculated at step 422*a* or 422*b* corresponds to the medium reception timestamp TSM2(k) calculated according to the above equation[4] and is accordingly a medium reception timestamp of the packets Pki received during the block period T(k). Further, the first-packet reception timestamp TS2(1, k) set at step 423*a* or 423*b* is the reception timestamp of the first packet Pki received during the block period T(k). Finally, the last-packet reception timestamp TS2(C2(k), k) set at step 424*a* or 424*b* is the reception timestamp of the last packet Pki received during the block period T(k).

Preferably, the time at which steps 421*a*-424*a* and 421*b*-424*b* are performed is delayed by a safety wait time SWT relative to the start time of the block period T(k+1). Indeed, due to the propagation delay of the packets Pki through the communication network CN or to a reception sequence error, the last packets marked by Va transmitted by the transmitting node N1 during an even block period T(k) may be received by the receiving node N2 at the beginning of the subsequent odd block period T(k+1). Hence, at the beginning of an odd block period T(k+1), the variables relating to packets marked by Va (namely C2*a*, TSC2*a* and LTS2*a*) may still be varying. Similarly, the last packets marked by Vb transmitted by the transmitting node N1 during an odd block period T(k) may be received by the receiving node N2 at the beginning of the subsequent even block period T(k+1). Hence, at the beginning of an even block period T(k+1), the variables relating to packets marked by Vb (namely C2*b*, TSC2*b* and LTS2*a*) may still be varying.

The safety wait time SWT guarantees that the variables relating to packets marked by Va or Vb are used for calculating the parameters to be transmitted to the management server MS only when their values are stabilized during the block period T(k+1). This also makes the time measurement based on such variables immune from reception sequence errors occurring at the edge between consecutive block periods. The safety wait time SWT is preferably comprised between 1 and 50% of the block period Tb. For instance, if the block period Tb is equal to 5 minutes, the safety wait time SWT may be equal to 20% Tb, namely 1 minute.

Then, the reception packet count C2(k), the first-packet reception timestamp TS2(1, k), the last-packet reception timestamp TS2(C2(k), k) and the medium reception timestamp TSM2(k) are transmitted to the management server MS (step 425), which will use them for calculating a medium delay DM(k) and a medium jitter JM(k) referred to the block period T(k), as it will be described in detail herein after. According to an alternative embodiment, before step 425 is performed, a medium one-point reception jitter OPJM2(k) may be calculated as the difference between the last-packet reception timestamp TS2(C2(k), k) and the first-packet reception timestamp TS2(1, k) divided by the reception packet count C2(k) decreased by 1. The calculated medium one-point reception jitter OPJM2(k) corresponds to the medium one-point reception jitter OPJM2(k) calculated according to the above equation [7]. In such case, at step 425 the medium one-point reception jitter OPJM2(k) may be transmitted in addition to or instead of TS2(1, k) and TS2(C2(k), k).

Step 425 may be performed e.g. by establishing a communication session between the receiving node N2 and the management server MS based on a known communication protocol, for instance FTP (File Transfer Protocol). The communication session may be started either by the receiving node N2 or the management server MS.

Further, step 425 is preferably performed at a random instant comprised between the end of step 424*a*/424*b* and the end of the block period T(k+1) brought forwards by a further safety wait time SWT'. This advantageously prevents the management server MS from receiving at the same time the parameters relating to all the nodes of the communication network CN, which may induce a congestion of the management server MS. The further safety wait time SWT' is preferably comprised between 1% and 40% Tb. For instance, if the block period Tb is 5 minutes, the further safety wait time SWT' may be 20%, i.e. 1 minute.

Hence, at each block period T(k+1), the management server MS receives:

the transmission packet count C1(k), the first-packet transmission timestamp TS1(1, k), the last-packet transmission timestamp TS1(C1(k), k), the medium transmission timestamp TSM1(k) and, optionally, the medium one-point transmission jitter OPJM1(k) from the transmitting node N1; and the reception packet count C2(k), the first-packet reception timestamp TS2(1, k), the last-packet reception timestamp TS2(C2(k), k), the medium reception timestamp TSM2(k) and, optionally, the medium one-point reception jitter OPJM2(k) from the receiving node N2.

At each block period T(k+1) the management server MS may then calculate the medium delay DM(k) according to the above equation[5], namely as a difference between the medium reception timestamp TSM2(k) and the medium transmission timestamp TSM1(k). The medium delay DM(k) calculated by the management server MS at the block period T(k+1) refers to the preceding block period T(k).

The medium delay measurement described above is advantageously resistant against possible packet loss and/or reception sequence errors occurring within the block period T(k). Indeed, in case one or more packets are lost before they are received at the receiving node N2, this slightly affects the accuracy of the medium delay calculated according to the equation[5] above, because the two medium timestamps TSM1(k) and TSM2(k) are calculated on different packet counts C1(k), C2(k).

In particular, in case a single packet is lost during the block period T(k), the error E on the medium transmission timestamp TSM1(k) (and therefore on the medium delay DM(k)) is:

$$E = TSM1(k)^* - TSM1(k),\quad [9a]$$

where TSM1(k)* is the medium transmission timestamp calculated on C1(k)=N−1 packets, namely without taking into account the transmission timestamp of the lost packet, while TSM1(k) is the medium transmission timestamp calculated on C1(K)=N packets, namely taking into account the transmission timestamp of the lost packet. Basically, TSM1(k) is the actually calculated medium transmission timestamp, whereas TSM1(k)* is the medium transmission timestamp which shall be used in equation [5] for providing a correct value of the medium delay DM(k) calculated on N−1 packets. The above equation[9a] may be written also as:

$$E = TSM1(k)^* - \frac{(N-1)\cdot TSM1^*(k) + TS1(i^*, k)}{N} = \frac{TSM1^*(k)}{N} - \frac{TS1(i^*, k)}{N},\quad [9b]$$

where TS1(i*, k) is the transmission timestamp of the lost packet.

Assuming that the transmission timestamps TS1(i, k) are substantially evenly distributed within the current block period T(k), and that accordingly the medium transmission timestamp is close to the middle of the block period T(k), the maximum error Emax occurs when the lost packet has the maximum distance from the middle of the block period T(k), namely when the lost packet is either the first packet or the last packet transmitted during the block period T(k). In such cases, its transmission timestamp TS1(i*, k) is equal to about TSM1*(k)±Tb/2, Tb being the duration of the block period. Hence, the maximum error Emax may be derived from above equation[9b] as:

$$E\max = \frac{TSM1^*(k)}{N} - \frac{TSM1^*(k) \pm Tb/2}{N} = \pm\frac{Tb/2}{N}\quad [9c]$$

Similarly, the average error Eav occurs when the lost packet has an average distance from the middle of the block period T(k), namely when the lost packet has a transmission timestamp TS1(i*, k) equal to TSM1*(k)±Tb/4. Hence, the average error Eav may be derived from above equation[9b] as:

$$Eav = \frac{TSM1^*(k)}{N} - \frac{TSM1^*(k) \pm Tb/4}{N} = \pm\frac{Tb/4}{N}\quad [9d]$$

In a more general case where n packets are lost during the block period T(k), the maximum error is n·Emax and the average error is n·Eav, assuming that all the lost packets either precede or follow the middle of the block period T(k) (which is usually the case, because packets at typically lost in bursts).

From the above equations [9c] and [9d], it is apparent that both the maximum error Emax and the average error Eav which affects the medium transmission timestamp TSM1(k) (and accordingly also the medium delay DM(k)) when packets are lost during the current block period T(k) decrease as the ratio between number of lost packets n and number of transmitted packets N decreases. For instance, in case Tb=5 minutes, n=1 and N=10⁶, the maximum error Emax is about 0.15 ms.

Furthermore, the medium delay measurement described above is resistant against possible reception sequence errors occurring during the block period T(k). Indeed, if the order in which packets are received at the receiving node N2 is different from the order in which they were transmitted by the transmitting node N1, the value of the medium reception timestamp TSM2(k) calculated according to equation[4] does not change. This happens also if, due to a reception sequence error, some packets transmitted during a block period are received during the subsequent block period, as discussed above with reference to the flow chart of FIG. 4.

In addition to the medium delay DM(k), the management server MS may also calculate the medium jitter JM(k) as:

$$JM(k) = \frac{TS2(C2(k), k) - TS2(1, k)}{C2(k) - 1} - \frac{TS1(C1(k), k) - TS1(1, k)}{C1(k) - 1}.\quad [10]$$

The medium jitter JM(k) calculated according to equation [10] is equal to the medium jitter JM(k) calculated according to above equation [8]. In particular, the first addend of equation[10] is the medium one-point reception jitter OPJM2(k) calculated according to above equation [7] while the second addend of equation[10] is the medium one-point transmission jitter OPJM1(k) calculated according to above equation[6]. Alternatively, in case the management server MS receives from the nodes N1, N2 the medium one-point jitters OPJM1(k), OPJM2(k), it preferably calculates the medium jitter JM(k) using the above equation [8], namely as their difference. The resulting medium jitter JM(k), in both cases, is the same. The medium jitter DM(k) calculated by the management server MS at the block period T(k+1) refers to the preceding block period T(k).

According to a particularly preferred embodiment, the management server MS preferably calculates the medium jitter JM(k) according to the following equation:

$$JM(k) = \frac{TS2(C2(k), k) - TS2(1, k)}{C1(k) - 1} - \frac{TS1(C1(k), k) - TS1(1, k)}{C1(k) - 1}. \quad [11]$$

In other words, both the medium one-point transmission jitter OPJM1(k) and the medium one-point reception jitter OPJM2(k) are calculated on the transmission packet count C1(k). Namely, possible packet loss occurring at the block period T(k) is preferably ignored. This advantageously allows providing an accurate medium jitter measurement also in case a packet loss occurs during the block period T(k), provided that the packet loss does not involve the first and last packets transmitted during the block period T(k). In any case, even if the packet loss involves the first packet and/or the last packet transmitted during the block period T(k), the error affecting the medium jitter JM(k) calculated according to the above equation[11] decreases as the transmission packet count C1(k) increases.

The medium jitter JM(k) calculated according to equation [10] or [11] is also resistant against possible reception sequence errors. In particular, reception sequence errors involving intermediate packets transmitted during the block period T(k) do not introduce any error in the medium jitter JM(k), because the result of equations [10] and [11] does not change. Besides, reception sequence errors involving either the first packet or the last packet transmitted during the block period T(k) introduce an error, whose value however increases as the transmission packet count C1(k) increases.

Hence, delay and jitter measurements indicative of the average delay and jitter undergone by all the packets transmitted during the block period T(k) are provided. In other words, the time measurements calculated according to the present invention provides an estimate of the performance of the packet flow PF during the block period T(k) as a whole.

The time measurements performed according to embodiments of the present invention advantageously require transmission of few data from the nodes to the management server MS (namely, the medium timestamps for the medium delay calculation and the first/last packet timestamps or the medium one-point jitters for the medium jitter), thereby allowing saving bandwidth in the communication network CN. Furthermore, as discussed above, such time measurements are very resistant against possible packet loss occurring within the block period T(k), especially when the packet counts 01(k), C2(k) in a block period T(k) are very high (1 million or so). Furthermore, as discussed above, such time measurements are very resistant against possible reception sequence errors occurring during the block period T(k) even when, due to a reception sequence error, some packets transmitted during a block period T(k) are received during the subsequent block period T(k+1).

The time measurement method described above comprises marking the packets Pki of the packet flow PF, and in particular periodically changing the marking value for dividing the packet flow PF in blocks. This is however not limiting. Indeed, according to alternative embodiments of the present invention, the packet flow PF may be divided in blocks without marking the packets Pki. In particular, according to a preferred embodiment, the transmitting node N1 may periodically insert in the packet flow PF an additional packet which marks the edge between a block period T(k) and the subsequent block period T(k+1). For instance, if the communication network CN is an Ethernet network, the additional packets may be OAM frames which, as defined by the ITU-T Recommendation Y.1731 (February 2008), Chapter 8.1 (pages 25-27), are currently used for allowing measurement of the frame loss. In such case, the medium transmission timestamp TSM1(k) relative to the current block period T(k) calculated at the transmitting node N1 may be advantageously transmitted to the receiving node N2 within the OAM packet inserted at the end of the subsequent block period T(k+1).

In general, in the time measurement method of the present invention, the packet flow PF may be divided in blocks by any technique, provided such technique allows identification of even block periods and odd block periods alternating in time. This allows implementing a double set of variables (counters and timestamps) relating to packets transmitted during even and odd block periods. This way, at each block period, one set of variables is varying (steps of FIGS. 3a and 4a) while the other set of variables has fixed value and may accordingly be used (steps of FIGS. 3b and 4b) for calculating the medium timestamps, medium delay and medium jitter as described above.

Optionally, at the block period T(k+1) the management server MS may also calculate:
- delay of the first packet transmitted/received during the block period T(k) as a difference between the first-packet reception timestamp TS2(1, k) and the first-packet transmission timestamp TS1(1, k);
- delay of the last packet transmitted/received during the block period T(k) as a difference between the last-packet reception timestamp TS2(C2(k), k) and the last-packet transmission timestamp TS1(C1(k), k); and
- jitter between the first packet transmitted/received during the block period T(k) and the last packet transmitted/received during the preceding block period T(k−1) as a difference between the delay of the first packet transmitted/received during the block period T(k) and a delay (calculated at the block period T(k)) of the last packet transmitted/received during the preceding block period T(k−1).

Such calculations provide, for each block period T(k), delay and jitter measurements referring to sample packets, namely the first packet and the last packet of each block period. Such delay and jitter measurements may be compared with the medium delay DM(k) and medium jitter JM(k). In case of a large mismatch, the operator may decide to further investigate for determining the reason why the delay or jitter of the sample packets is so far from the calculated medium values.

Herein after, a particularly advantageous variant of the method for performing a time measurement according to the present invention will be described in detail.

With reference again to FIG. 3a, at the transmission side, during even (odd) block periods, at step 302a (302b), instead of the cumulative transmission timestamp TSC1a (TSC1b), a cumulative transmission time difference TDC1a (TDC1b) is provided and initialised to zero. Then, if at step 306a (306b) it is determined that the packet Pki is the first packet of the block period T(k), only step 307a (307b) is carried out, while step 308a (308b) is preferably omitted. Otherwise, if at step 306a (306b) it is determined that the packet Pki is not the first packet of the block period T(k), step 309a (309b) is carried out as described above, while at step 310a (310b) the value of the cumulative transmission time difference TDC1a (TDC1b) is increased by the difference between the first (second) last-packet transmission timestamp LTS1a (LTS1b) and the first (second) first-packet transmission timestamp FTS1a (FTS1b), namely:
- at step 310a (even block periods): TDC1a=TDC1a+ (LTS1a−FTS1a); and
- at step 310b (odd block periods): TDC1b=TDC1b+ (LTS1b−FTS1b).

As step 310a (310b) is iterated, the cumulative transmission time difference TDC1a (TDC1b) then cumulates the offsets between the transmission timestamps of the packets transmitted during the block period T(k) and the transmission timestamp of the first packet transmitted during the block period T(k).

With reference now to FIG. 3b, at step 322a (322b) the medium transmission timestamp TSM1(k) may then be calculated as the cumulative transmission time difference TDC1b (TDC1a) calculated at the last iteration of step 310b (310a) divided by the second (first) transmission counter C1b (C1a), and then increased by the second (first) first-packet transmission timestamp FTS1b (FTS1a), namely:

at step 322a (even block periods): $TSM1(k) = \frac{TDC1b}{C1b} + FTS1b$; and at step 322b (odd block periods): $TSM1(k) = \frac{TDC1a}{C1a} + FTS1a$.

With reference to FIG. 4a, at the reception side, during even (odd) block periods, at step 402a (402b), instead of the cumulative reception timestamp TSC2a (TSC2b), a cumulative reception time difference TDC2a (TDC2b) is provided and initialised to zero. Then, if at step 405a (405b) it is determined that the packet Pki is the first packet of the block period T(k), only step 406a (406b) is carried out, while step 407a (407b) is preferably omitted. Otherwise, if at step 405a (405b) it is determined that the packet Pki is not the first packet of the block period T(k), step 408a (408b) is carried out as described above, while at step 409a (409b) the value of the cumulative reception time difference TDC2a (TDC2b) is increased by the difference between the first (second) last-packet reception timestamp LTS2a (LTS2b) and the first (second) first-packet reception timestamp FTS2a (FTS2b), namely:
- at step 409a (even block periods): TDC2a=TDC2a+ (LTS2a−FTS2a); and
- at step 409b (odd block periods): TDC2b=TDC2b+ (LTS2b−FTS2b).

As step 409a (409b) is iterated, the cumulative reception time difference TDC2a (TDC2b) then cumulates the offsets between the reception timestamps of the packets received during the block period T(k) and the reception timestamp of the first packet received during the block period T(k).

With reference now to FIG. 4b, at step 422a (422b) the medium reception timestamp TSM2(k) may then be calculated as the second (first) cumulative reception time difference TDC2b (TDC2a) calculated at the last iteration of step 409b (409a) divided by the second (first) reception counter C2b (C2a), and then increased by the second (first) first-packet reception timestamp FTS2b (FTS2a), namely:

at step 422a (even block periods): $TSM2(k) = \frac{TDC2b}{C2b} + FTS2b$; and at step 422b (odd block periods): $TSM2(k) = \frac{TDC2a}{C2a} + FTS2a$.

In other words, according to such advantageous variant, instead of cumulating the absolute timestamps of the packets transmitted/received in a block period T(k), only their offsets relative to the timestamp of the first packet transmitted/received during the block period T(k) are cumulated. Then, at the subsequent block period T(k+1), the cumulative offset is divided by the number of transmitted/received packets, thereby determining a medium offset which, increased by the timestamp of the first transmitted/received packet, results again in a medium absolute timestamp.

Advantageously, the cumulative time differences TDC1a, TDC1b, TDC2a, TDC2b have much smaller values than the corresponding cumulative timestamps TSC1a, TSC1b, TSC2a, TDS2b. Accordingly, their values may be represented by a much smaller number of digits. The operations 310a, 310b, 409a, 409 are accordingly much easier to implement from the computational point of view and are less likely to undergo overflow problems.

In the above description, it has been assumed that all the steps of the flow charts of FIGS. 3a, 3b are carried out at the transmitting node N1, whereas all the steps of the flow charts of FIGS. 4a, 4b are carried out at the receiving node N2. This is however not limiting. Indeed, in some cases it may be undesirable or even impossible to implement the method for performing a time measurement at the nodes. This is the case, for instance, when the nodes of the communication network do not comprise the basic functionalities required to support the execution of the method steps, or when the nodes are of different vendors and, accordingly, their reconfiguration would be a very long and costly operation. In such situations, according to alternative embodiments of the present invention, at least some of the method steps are carried out by dedicated computers connected to the nodes, as it will be described in detail herein after.

Figure 5A:
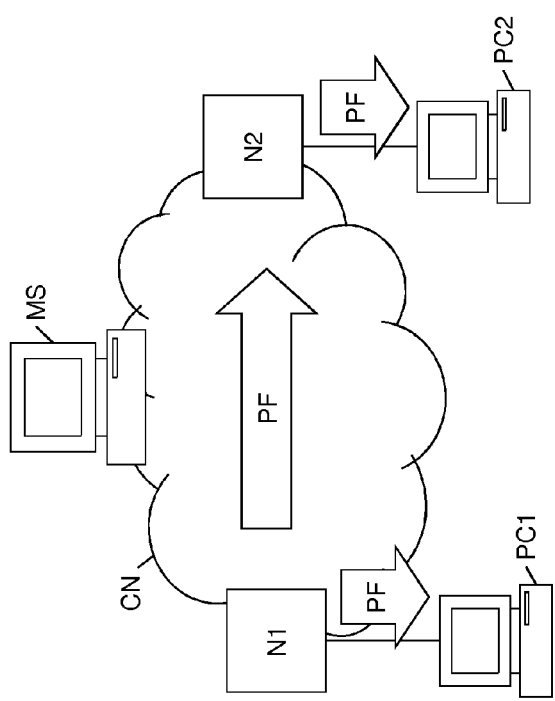
FIGS. 5a, 5b and 5c show three alternative embodiments of the method for performing a time measurement in the communication network of FIG. 1.

According to a first alternative embodiment shown in FIG. 5a, the transmitting node N1 is preferably connected to a first computer PC1 through a port different from the port through which the packet flow PF is transmitted. Similarly, the receiving node N2 is preferably connected to a second computer PC2 through a port different from the port through which the packet flow PF is received.

By referring to the flow charts of FIGS. 3a and 3b, according to this first alternative embodiment, the transmitting node N1 is configured to:
- mark each packet Pki (steps 301, 303a/303b, 304a/304b);
- create a copy of each marked packet Pki (e.g. by using a mirroring function of the node);
- transmit the packet Pki to the receiving node (step 311a/311b); and
- transmit the copy of the packet Pki to the first computer PC1.

Further, according to this first alternative embodiment, the first computer PC1 is configured to:
- initialise the variables relating to packets transmitted during the current block period (steps 301 and 302a/302b);
- receive the copies of the marked packets Pki from the transmitting node N1;
- upon reception of each copy, increase the relevant variables (steps 306a/306b to 310a/310b);
- discard the copies of the marked packets Pki received from the transmitting node N1;
- calculate the parameters relating to the previous block period (steps 321a/321b to 324a/324b); and
- transmit the calculated parameters to the management server MS (step 325).

By referring to the flow charts of FIGS. 4a and 4b, according to this first alternative embodiment the receiving node N2 is configured to:
- create a copy of each marked packet Pki received from the transmitting node N1 (e.g. by using a mirroring function of the node); and
- transmit the copy of the packet Pki to the second computer PC2.

Further, according to this first implementation, the second computer PC2 is configured to:
- initialise the variables relating to packets received during the current block period (steps 401 and 402a/402b);
- receive the copies of the marked packets Pki from the receiving node N2;
- upon reception of each copy, increase the relevant variables (steps 404a/404bb to 409a/409b);
- discard the copies of the marked packets Pki received from the receiving node N2;
- calculate the parameters relating to the previous block period (steps 421a/421b to 424a/424b); and
- transmit the calculated parameters to the management server MS (step 425).

In other words, according to this first implementation, the node N1 only marks the packets Pki for dividing the packet flow PF in blocks, while the time measurement is performed by the computers PC1, PC2 on a copy of the real traffic transmitted in the communication network CN. A marking functionality already available at the node N1 may be exploited for supporting the time measurement performed by the computers PC1, PC2. Advantageously, in case one of the PCs is failed, only the time measurement is affected, whereas transmission of the packet flow PF is unaffected.

Figure 5B:
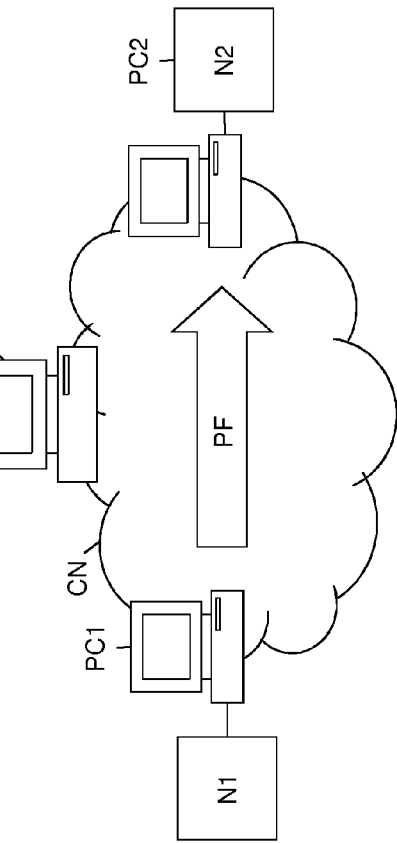

According to a second alternative embodiment shown in FIG. 5b, the transmitting node N1 is preferably connected to a first computer PC1 through the same port through which the packet flow PF is transmitted. Similarly, the receiving node N2 is preferably connected to a second computer PC2 through the same port through which the packet flow PF is received. In other words, the first computer PC1 and the second computer PC2 are pass-through probes located on the path followed by the packet flow PF between the transmitting node N1 and the receiving node N2.

According to this second alternative embodiment, the first computer PC1 is configured to perform all the steps of the flow charts of FIGS. 3a and 3b, while the second computer PC2 is configured to perform all the steps of the flow charts of FIGS. 4a and 4b.

In other words, according to this second alternative embodiment, the nodes N1, N2 do not perform any operation supporting the time measurement, which is completely in charge to the computers PC1, PC2. The computers PC1, PC2 basically implements all the traffic processing functions of a node, plus the time measurements functions. Hence, the time measurement may be implemented independently of the functionalities available at the nodes N1, N2. This allows implementing the time measurement on real traffic transmitted in communication networks comprising nodes of different types and different vendors.

Figure 5C:
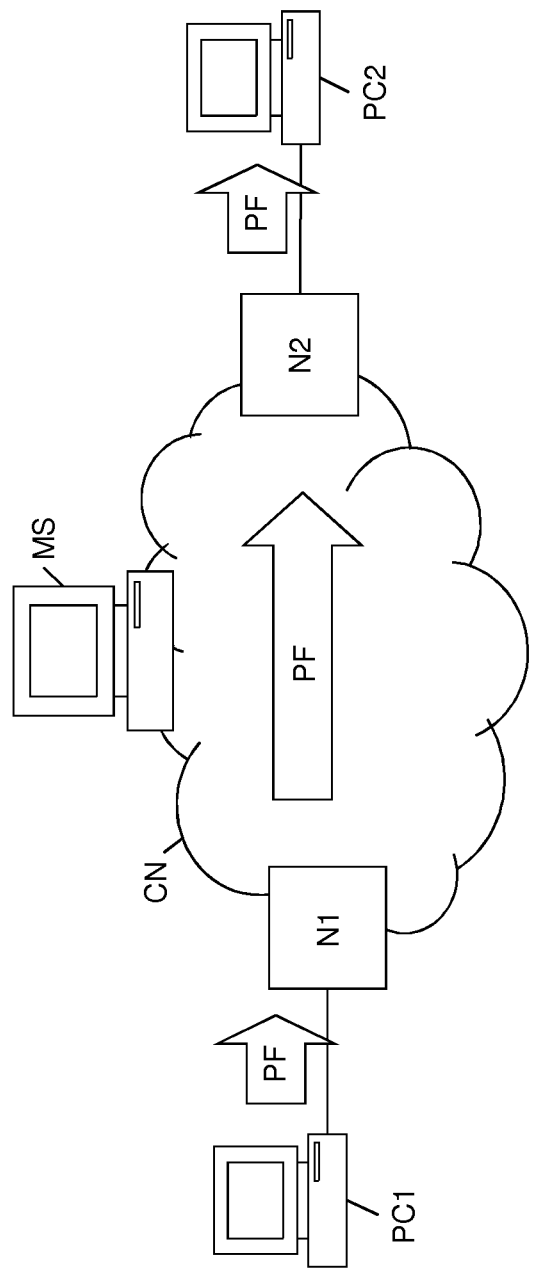

According to a third alternative embodiment shown in FIG. 5c, the transmitting node N1 is preferably connected to a first computer PC1 from which it receives the traffic flow PF. Besides, the receiving node N2 is preferably connected to a second computer PC2 to which it forwards the traffic flow PF.

According to this third alternative embodiment, the first computer PC1 is configured to generate the packet flow PF and perform all the steps of the flow charts of FIGS. 3a and 3b, while the second computer PC2 is configured to perform all the steps of the flow charts of FIGS. 4a and 4b and terminate the packet flow PF.

In other words, the computers PC1, PC2 provide an artificial traffic which, between the nodes N1 and N2, is mixed with real traffic exchanged by the nodes N1 and N2. According to such third embodiment, the computers PC1, PC2 then perform the time measurements on the artificial traffic, and accordingly provide results which are approximately indicative of the real traffic performance. Also according to this third alternative embodiment, the nodes N1 and N2 do not perform any operation supporting the time measurement, which is completely in charge to the computers PC1, PC2. Hence, the time measurement may be implemented independently of the functionalities available at the nodes N1, N2. This allows implementing the time measurement on artificial traffic transmitted in communication networks comprising nodes of different types and different vendors.

The above description is referred to a one-way traffic from N1 to N2. However, the method for performing a time measurement according to embodiments of the present invention may be applied to bidirectional traffic exchanged between N1 and N2. In such case, the node N1 (or the first computer PC1) preferably performs the operations of FIGS. 3a, 3b on the packet flow transmitted to the node N2, while it performs the operations of FIGS. 4a, 4b on the opposite packet flow received from the node N2. Symmetrically, the node N2 (or the second computer PC2) preferably performs the operations of FIGS. 3a, 3b on the packet flow transmitted to the node N1, while it performs the operations of FIGS. 4a, 4b on the opposite traffic flow received from the node N1. In such case, two medium delays (and jitters) may be calculated, one referring to the propagation direction from N1 to N2 and the other referring to the opposite propagation direction from N2 to N1.

The medium delays may be advantageously add together, thereby providing a medium round-trip delay between the nodes N1 and N2. Such medium round-trip delay is indeed an estimate, since it is not measured on a same packet transmitted back and forth between N1 and N2. However, it is a quite accurate estimate, since it is calculated as an average on a high number of packets of two counter-propagating packet flows. The inventors have estimated that the accuracy of the medium round-trip delay calculated as described above is comparable to the accuracy of the round-trip delay calculated with a ping function. However, advantageously, differently from the ping function, the calculation of the medium round-trip delay is performed on real traffic and does not require the transmission of any artificial packet.

Further, in the above description it has been assumed that the nodes N1, N2 transmit the respective calculated parameters (packet count, medium timestamp, first-packet timestamp, last-packet timestamp and, optionally, medium one-point jitter) to the management server MS, which uses them for calculating the medium delay and medium jitter. According to alternative embodiments, the calculation of medium delay and medium jitter may be carried out by one of the nodes N1, N2. Hence, assuming for instance that the calculation is performed by the receiving node N2, the transmitting node N1 shall transmit to the receiving node N1 the calculated parameters. Such parameters may be inserted in a dedicated packet, for instance an OAM frame. Hence, according to such embodiments, the calculation of time measurements relating to various packet flows is advantageously distributed at the nodes of the communication network CN.

The invention claimed is:

1. A method for performing a time measurement comprising:

transmitting at least two packets of a packet flow during a block period and from a first node of a communication network to a second node of the communication network;

determining, for the at least two packets of the packet flow transmitted during the block period, a medium transmission timestamp indicative of an average of at least two transmission timestamps generated upon transmission of the at least two packets, wherein the at least two transmission timestamps relate to the at least two packets, and wherein the determining the medium transmission timestamp is performed by the first node of the communication network;

determining, for the at least two packets of the packet flow transmitted during the block period, a medium reception timestamp indicative of an average of at least two reception timestamps generated upon reception of the at least two packets, wherein the at least two reception timestamps relate to the at least two packets, and wherein the determining the medium reception timestamp is performed by the second node of the communication network; and determining, based on the medium transmission timestamp and the medium reception timestamp, a medium time measurement indicative of an average performance of the packet flow during the block period.

2. The method according to claim 1, wherein:

the medium time measurement comprises a medium delay calculated as a difference between the medium reception timestamp and the medium transmission timestamp.

3. The method according to claim 1, further comprising:

determining a medium one-point transmission jitter calculated as a difference between a last-packet transmission timestamp indicative of a transmission time of a last packet of the at least two packets and a first-packet transmission timestamp indicative of a transmission time of a first packet of the at least two packets, divided by a first number of packets transmitted by the first node during the block period decreased by 1;

determining a medium one-point reception jitter calculated as a difference between a last-packet reception timestamp indicative of a reception time of the last packet of the at least two packets and a first-packet reception timestamp indicative of a reception time of the first packet of the at least two packets, divided by a second number of packets received by the second node during the block period decreased by 1; and determining a medium jitter calculated as a difference between the medium one-point reception jitter and the medium one-point transmission jitter.

4. The method according to claim 1, further comprising:

determining a medium one-point transmission jitter calculated as a difference between a last-packet transmission timestamp indicative of a transmission time of a last packet of the at least two packets and a first-packet transmission timestamp indicative of a transmission time of a first packet of the at least two packets, divided by a first number of packets transmitted by the first node during the block period decreased by 1;

determining a medium one-point reception jitter calculated as a difference between a last-packet reception timestamp indicative of a reception time of the last packet of the at least two packets and a first-packet reception timestamp indicative of a reception time of the first packet of the at least two packets, divided by the first number of packets transmitted by the first node during the block period decreased by 1; and determining a medium jitter calculated as a difference between the medium one-point reception jitter and the medium one-point transmission jitter.

5. The method according to claim 1, further comprising: upon transmission of the packet flow, dividing the packet flow in first packets transmitted during first block periods and second packets transmitted during second block periods, the first block periods alternating in time with the second block periods.

6. The method according to claim 5, wherein the dividing comprises marking the first packets by a first marking value and marking the second packets by a second marking value.

7. The method according to claim 1, wherein the determining the medium time measurement is performed by a management server cooperating with the communication network.

8. The method according to claim 1, wherein the determining the medium time measurement is performed by one of the first node and the second node.

9. The method of claim 1, further comprising:

receiving, at a server in communication with the communication network and from the first node, the medium transmission timestamp; and receiving, at the server in communication with the communication network and from the second node, the medium reception timestamp.

10. The method of claim 9, wherein the determining the medium time measurement is performed by the server in communication with the communication network after receiving the medium transmission timestamp from the first node and after receiving the medium transmission timestamp from the from the second node.

11. A node of a communication network, wherein the node is configured to:

transmit at least two packets of a packet flow during a block period to another node of the communication network;

determine, for the at least two packets of the packet flow transmitted during the block period, a medium transmission timestamp indicative of an average of at least two transmission timestamps generated upon transmission of the at least two packets, wherein the at least two transmission timestamps relate to the at least two packets; and transmit the medium transmission timestamp for determining, based on the medium transmission timestamp and a medium reception timestamp, a medium time measurement indicative of an average performance of the packet flow during the block period, wherein the medium reception timestamp is determined by the another node of the communication network.

12. A node of a communication network, wherein the node is configured to:

receive, from another node of the communication network, at least two packets of a packet flow which were transmitted by the another node during a block period;

determine, for the received at least two packets of the packet flow which were transmitted by the another node during the block period, a medium reception timestamp indicative of an average of at least two reception timestamps generated upon reception of the at least two packets, wherein the at least two reception timestamps relate to the at least two packets; and transmit the medium reception timestamp for determining, based on a medium transmission timestamp and the medium reception timestamp, a medium time measurement indicative of an average performance of the packet flow during the block period, wherein the medium transmission timestamp is determined by the another node of the communication network.

13. A communication network comprising:
a first node; and
a second node, wherein the first node is configured to:
   transmit, to the second node of the communication network, at least two packets of a packet flow during a block period;
   determine, for the at least two packets of the packet flow transmitted during the block period, a medium transmission timestamp indicative of an average of at least two transmission timestamps generated upon transmission of the at least two packets, wherein the at least two transmission timestamps relate to the at least two packets; and
   transmit the medium transmission timestamp for determining, based on the medium transmission timestamp and a medium reception timestamp, a medium time measurement indicative of an average performance of the packet flow during the block period, and
wherein the second node is configured to:
   receive, from the first node, the at least two packets of the packet flow;
   determine, for the at least two packets of the packet flow transmitted during the block period, the medium reception timestamp indicative of an average of at least two reception timestamps generated upon reception of the at least two packets, wherein the at least two transmission timestamps relate to the at least two packets from the first node; and
   transmit the medium reception timestamp for determining, based on the medium transmission timestamp and the medium reception timestamp, the medium time measurement indicative of the average performance of the packet flow from the first node during the block period.

14. A non-transitory computer readable medium including software code portions stored thereon that, when executed by at least one computer, perform a method of performing a time measurement comprising:
   transmitting at least two packets of a packet flow during a block period and from a first node of a communication network to a second node of the communication network;
   determining, for the at least two packets of the packet flow transmitted during the block period, a medium transmission timestamp indicative of an average of at least two transmission timestamps generated upon transmission of the at least two packets, wherein the at least two transmission timestamps relate to the at least two packets, and wherein the determining the medium transmission timestamp is performed by the first node of the communication network;
   determining, for the at least two packets of the packet flow transmitted during the block period, a medium reception timestamp indicative of an average of at least two reception timestamps generated upon reception of the at least two packets, wherein the at least two reception timestamps relate to the at least two packets, and wherein the determining the medium reception timestamp is performed by the second node of the communication network; and
   determining, based on the medium transmission timestamp and the medium reception timestamp, a medium time measurement indicative of an average performance of the packet flow during the block period.

15. The non-transitory computer readable medium according to claim 14, including software code portions stored thereon that, when executed by the at least one computer, perform the method further comprising:
   determining a medium one-point transmission jitter calculated as a difference between a last-packet transmission timestamp indicative of a transmission time of a last packet of the at least two packets and a first-packet transmission timestamp indicative of a transmission time of a first packet of the at least two packets, divided by a first number of packets transmitted by the first node during the block period decreased by 1;
   determining a medium one-point reception jitter calculated as a difference between a last-packet reception timestamp indicative of a reception time of the last packet of the at least two packets and a first-packet reception timestamp indicative of a reception time of the first packet of the at least two packets, divided by the first number of packets transmitted by the first node during the block period decreased by 1; and
   determining a medium jitter calculated as a difference between the medium one-point reception jitter and the medium one-point transmission jitter.

\* \* \* \* \*